(12) United States Patent
Van Weezenbeek et al.

(10) Patent No.: US 9,487,664 B2
(45) Date of Patent: Nov. 8, 2016

(54) USE OF A PRESERVING AGENT FOR TEMPORARILY STORING USED PAINT APPLICATION TOOLS, DEVICE USING THIS AND COMPOSITE KIT THEREFORE

(75) Inventors: Sebastiaan Joannes Van Weezenbeek, Alkmaar (NL); Michel Hendrikus Wilhelmus Kosman, Nijmegen (NL); Sebastiaan Maria Van Der Geest, Goor (NL)

(73) Assignees: HILDERING INNOVATIONS B.V., Ijmuiden (NL); VDG INNOVATIONS B.V., Enschede (NL)

( * ) Notice: Subject to any disclaimer, the term of this patent is extended or adjusted under 35 U.S.C. 154(b) by 756 days.

(21) Appl. No.: 13/437,252

(22) Filed: Apr. 2, 2012

(65) Prior Publication Data

US 2012/0255878 A1 Oct. 11, 2012

(30) Foreign Application Priority Data

Apr. 6, 2011 (NL) .................................... 2006555

(51) Int. Cl.
*A46B 17/04* (2006.01)
*C09D 9/00* (2006.01)

(52) U.S. Cl.
CPC ................ *C09D 9/00* (2013.01); *A46B 17/04* (2013.01)

(58) Field of Classification Search
CPC .... A46B 17/04; A46B 17/06; A46B 17/065; A61L 2/16

USPC ...................................................... 422/40, 41
See application file for complete search history.

(56) References Cited

U.S. PATENT DOCUMENTS

| | | | | |
|---|---|---|---|---|
| 2,679,315 A | * | 5/1954 | Zegers | .......................... 206/361 |
| 5,698,188 A | | 12/1997 | Evans | |
| 6,150,315 A | | 11/2000 | Komocki et al. | |
| 6,190,678 B1 | * | 2/2001 | Hasenoehrl | .......... A61K 8/0208 424/401 |
| 6,695,513 B1 | | 2/2004 | Malek | |

FOREIGN PATENT DOCUMENTS

WO 00/20230 A1 4/2000

OTHER PUBLICATIONS

Kahara et al. Preservative-free and self-preserving cosmetics and drugs. Marcel Dekker Inc. 1997.*
NL Search Report for NL 2006555, Dec. 2, 2011.

* cited by examiner

*Primary Examiner* — Sean E Conley
*Assistant Examiner* — Donald Spamer
(74) *Attorney, Agent, or Firm* — Hoffmann & Baron, LLP

(57) ABSTRACT

A preserving agent for temporarily storing used paint application tools, in particular paint brushes and paint rollers, is used by immersing at least the paint containing portion of the paint application tool therein. The preserving agent is a water based gel. An electrolyte is used for breaking up the gel afterwards. A device for temporarily storing used paint application tools, and a composite kit, including the device, the water based gel, and the electrolyte are included.

11 Claims, No Drawings

USE OF A PRESERVING AGENT FOR TEMPORARILY STORING USED PAINT APPLICATION TOOLS, DEVICE USING THIS AND COMPOSITE KIT THEREFORE

CROSS-REFERENCE TO RELATED APPLICATIONS

This application claims the benefit of Netherlands Application No. 2006555, filed Apr. 6, 2011, the contents of which is incorporated by reference herein.

FIELD OF THE INVENTION

The present invention relates to he use of a preserving agent for temporarily storing used paint application tools, in particular paint brushes and paint rollers, by immersing at least the paint containing portion of the paint application tool therein.

Paint application tools are not particularly limited and comprise paint brushes, paint rollers and the like, but in the remainder of the specification for simplicity reasons mainly paint brushes or briefly brushes will be discussed, without limiting the application thereto.

BACKGROUND OF THE INVENTION

In the prior art it is a well known problem, what to do with used brushes when they are not being used for a certain relatively short period of time. During painting it frequently occurs that brushes and the like need to be stored, as they are used again with the same colour paint for example after lunch, the next day, or even after a few weeks. A relatively short period of time concerns a period of time which is customary during painting of an object during which a used paint brush, containing paint residue, is not used temporarily. In that case it is unduly laborious to cleanse the brushes. This is a problem for both water based- and solvent based paints.

It is well known to wrap brushes in plastic (GLAD wrap or cling foil)—or aluminium foil, to immerse in water or a solvent, to immerse in linseed oil, etc. Further examples are known of containers containing an amount of a volatile substance saturating a space being positioned above said substance. The brushes are hung in the upper space of the container so that these do not dry out.

All these methods have their accompanying disadvantages and problems and have all shown to be insufficient for adequately preserving the paint application tool containing paint residue, so that it can immediately be used again later without any intermediate cleansing step.

While cleansing brushes a substantial amount of cleansing liquid waste is formed which is frequently flushed into the sewer, as for example the brushes are rinsed clean under the tap above the sink. Both in case of water-soluble paints and in the case of solvent soluble paints this is a very environmental unfriendly and environmental polluting problem.

Wrapping in foil has shown to be insufficient in practice as drying out always occurs.

Immersion in a liquid means almost always that the liquid is absorbed in the brush. This can lead to saturation of the brush with the liquid. The liquid absorbed by the brush can only be removed with difficulty afterwards. Also by expansion of the bundle of brush hairs, the brush can be damaged such that it becomes useless. The clamping ring or other component keeping the brush hairs together can even rupture. During subsequent use it is also relatively laborious to substantially remove the liquid. The brush then has to be firmly swept dry with the accompanying contamination problem and environmental pollution.

In practice one does not seem to take it all too serious with environmental pollution. Brushes are rinsed above the sink or just swept dry outdoors.

In the prior art therefore an urgent demand exists for a suitable method for temporarily storing brushes and other paint application tools while saving the environment and whereby the paint application tool can be used again without any intermediate elaborate cleansing step.

SUMMARY OF THE INVENTION

The present invention intends to meet said need and therefore provides the use of a preserving agent for temporarily storing used paint application tools, in particular paint brushes and paint rollers, by immersing at least the paint containing portion of the paint application tool therein, said use being characterized in that the preserving agent is a water based gel.

DETAILED DESCRIPTION OF THE INVENTION

Surprisingly it appeared that the temporarily storing of a paint brush or other paint application tool in a water based gel protects the paint brush from the environment in such a good manner that the paint residue in the brush does not dry out and the brush can be used again very well afterwards without too many additional cleansing operations. Further the gel substantially does not penetrate the brush and removal of gel residue before subsequent use of the brush is simple. It is sufficient to wipe the brush with for example a piece of paper or a cloth.

An additional advantage of the use of a water based gel as a preserving agent is that with suitable selection of the viscosity of the gel the brushes will be suspended in the gel and will not come to rest on the bottom of the container so that no permanent deformation of the hairs of the brush occurs. Also in that case no specific fastening means are necessary for the brushes in the container used.

One of the most important advantages of the present invention is that it concerns the use of an environmentally friendly product.

In particular the preserving agent further contains a biocide. Hereby it is avoided that in time the formation of mould or other degeneration of the gel can occur. Advantageously the biocide is selected from phenoxy ethanol, parabenes, bronopol, formaldehyde, formaldehyde donors, benzyl alcohol, capryl glycol, potassium sorbate, sodium benzoate. Preferably an environmentally friendly biocide is used, in particular an organic biocide.

A water based gel substantially consists of water and a binder. In general the gel will contain more than 70% by weight of water, in particular more than 80% by weight, preferably more than 90% by weight and more preferably more than 95% by weight. Examples of binders are carbomer, xanthane gum, cellulose derivatives, Guar gum, polymethacrylate, acrylate copolymer, acrylate crosspolymer, etc.

The preserving agent used according to invention can contain all sorts of additional additives as long as they do not influence the advantageous properties of the invention in an excessively negative manner. Examples of other additives are a humectant, a complexing agent, a neutralising agent, an odorous substance, etc.

Humectants are for example glycerine, propylene glycol, butylene glycol, sorbitol, polysaccharides, etc.

Examples of complexing agents are for example Dissolvine, Titriplex, EDTA, etc.

Neutralising agents can for example be selected from triethanolamine, sodium hydroxide, potassium hydroxide, AMP, ammonia, barium hydroxide, calcium hydroxide, sodium carbonate, etc.

Preferably the preserving agent used according to the invention contains an odorous substance. This serves to provide a for the user pleasant and in particular fresh smell to the preserving agent. Odorous substances can be selected from perfume, etheric oils, etc.

The invention further relates to a water based gel clearly intended for use as a preserving agent according to the invention.

The invention further relates to an electrolyte clearly intended for breaking up the water based gel used according to the invention to a water thin viscosity. By breaking up the gel after use, when it is contaminated with paint residue, with the electrolyte, the paint residue appears to accumulate in the lower portion of the container, and the water, being the main constituent of the gel, can easily be decanted.

Examples of electrolytes are simple aqueous solutions of NaCl, KI, MgSO$_4$, etc. Preferably the electrolytes are environmentally friendly salts.

In particular a flocculant is added to the gel being broken up in order to flocculate the contaminants. Examples thereof are inter alia iron salts. The flocculant can be added simultaneously with the electrolyte.

The invention further relates to a device intended for temporarily storing used paint application tools, in particular paint brushes and paint rollers, at least comprising a container containing a preserving agent for the paint application tools, whereby in use at least the paint containing portion of the paint application tools is immersed in the preserving agent, said device being characterized in that the preserving agent is a preserving agent according to the invention.

Such a device in its most simple design is a closable container, for example a bucket with a lid. A more specific embodiment can comprise an assembly of multiple containers for example three containers being coupled to each other. Whereby one container is intended for brushes with white and other lightly coloured paint, another container for brushes with dark coloured paint and a final container for wiping off adhering gel from the brushes.

Finally the invention relates to a composite kit intended for temporarily storing used paint application tools, comprising a device according to the invention, a water based gel according to the invention, and an electrolyte according to the invention.

This composite kit can be purchased by the user and comprises all elements that make putting the invention into practice possible. In practice all elements will be packaged separately and every package in that case should be opened separately to be able to be used for the intended purpose at the necessary moment. It will be clear that all the components of the kit can be provided in any form; that is also as mixable ingredients for the respective components. As an example the water based gel can be provided as a dry binder, possibly mixed with other dry ingredients for the gel, to which the user has to add water before use.

In the following the invention will be further elucidated by means of an example.

EXAMPLE

A bucket made of biopolymer plastic with a content of 3 l was filled with 2.5 l of a gel containing the following ingredients (in weight %):

95% of water
0.5% of alkyl acrylate crosspolymer
3% of glycerine
0.1% of hydrogenated castor oil/PEG
0.05% of propylene glycol
0.1% of phenoxy ethanol
0.1% of ethyl hexyl glycerine
0.1% of imidazolidinyl urea
0.025% of tetrasodium glutamate diacetate
1% of triethanolamine
0.025% of citrus limonum This water based gel functioned excellently for the purpose according to the invention as a preserving agent for temporarily storing used paint application tools.

With this gel several tests were performed with brushes being used with different kinds of paint. Used kinds of paint were linseed oil based paint, synthetic water based paint and synthetic solvent silicone based paint.

The next test was performed with the different kinds of paint with for every kind of paint a separate similar brush.

At a fixed time of the day a brush was immersed in the paint, subsequently wiped off on the edge of the paint can and was briefly used for painting a surface. Thereafter the brush was put in the gel. The next day at the same time the brush was removed from the gel and wiped off at the edge of the gel bucket and the first steps of immersing in the paint, wiping off on the edge of the can and painting were repeated. Then the brush was put in the gel again.

This entire process was repeated during at least one month. During this month the gel was open to the air and no sealing whatsoever of the gel in the bucket was used.

All brushes with all kinds of paint appeared not to dry in at all and remained excellently usable for direct painting after being removed from the gel and wiped off on the edge of the bucket. Also the gel remained very well usable despite after being exposed to the air for a month.

The invention claimed is:

1. A method comprising:
   providing a preserving agent for temporarily storing a used paint application tool for a relatively short period of time, wherein the preserving agent is a water based gel consisting of water and a binder, and optionally containing a biocide, an organic biocide and a perfume;
   immersing at least the paint containing portion of the paint application tool therein; and
   before re-use of the paint application tool for applying paint with the same colour as before within the relatively short period of time, removing gel-residue from the paint application tool, without further cleansing.

2. The method according to claim 1, wherein the paint application tool is selected from the group consisting of paint brushes and paint rollers.

3. The method according to claim 1, wherein the binder is selected from the group consisting of carbomer, xanthane gum, cellulose derivatives, Guar gum, polymethacrylate, acrylate copolymer, and acrylate crosspolymer.

4. The method according to claim 1, wherein the paint application tool is wiped with a piece of paper or a cloth for removing the gel-residue.

5. A method comprising:
   providing a preserving agent for temporarily storing used paint application tools; and
   immersing at least the paint containing portion of the paint application tool therein;
   introducing an electrolyte and a flocculant into the preserving agent; and breaking up the preserving agent into a water thin viscosity portion and a paint residue containing portion;
wherein the preserving agent is a water based gel consisting essentially of water and a binder.

6. The method according to claim 5, further comprising:
decanting the water thin viscosity portion from the paint residue containing portion.

7. The method according to claim 5,
wherein the preserving agent further contains a biocide.

8. The method according to claim 7,
wherein the biocide is an organic biocide.

9. The method according to claim 5,
wherein the preserving agent further contains a perfume.

10. The method according to claim 5, wherein the paint application tools are selected from the group consisting of paint brushes and paint rollers.

11. The method according to claim 5, wherein the binder is selected from the group consisting of carbomer, xanthane gum, cellulose derivatives, Guar gum, polymethacrylate, acrylate copolymer, and acrylate crosspolymer.

* * * * *